E. N. TUCKEY.
EDUCATIONAL APPLIANCE.
APPLICATION FILED OCT. 1, 1913.
1,204,089.
Patented Nov. 7, 1916.
4 SHEETS—SHEET 3.
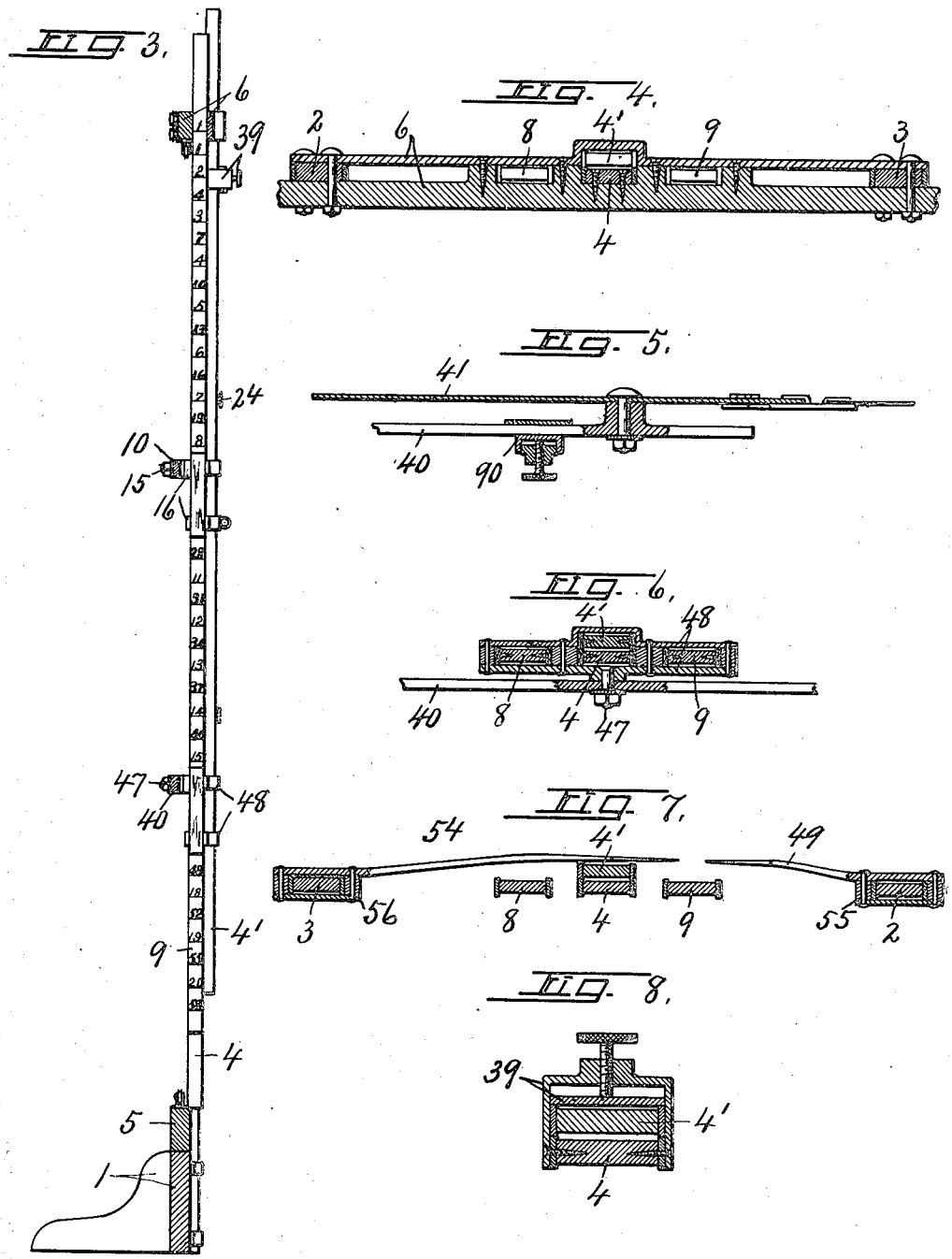
WITNESSES:
INVENTOR
E. N. Tuckey
BY Howard P. Denton
ATTORNEY.

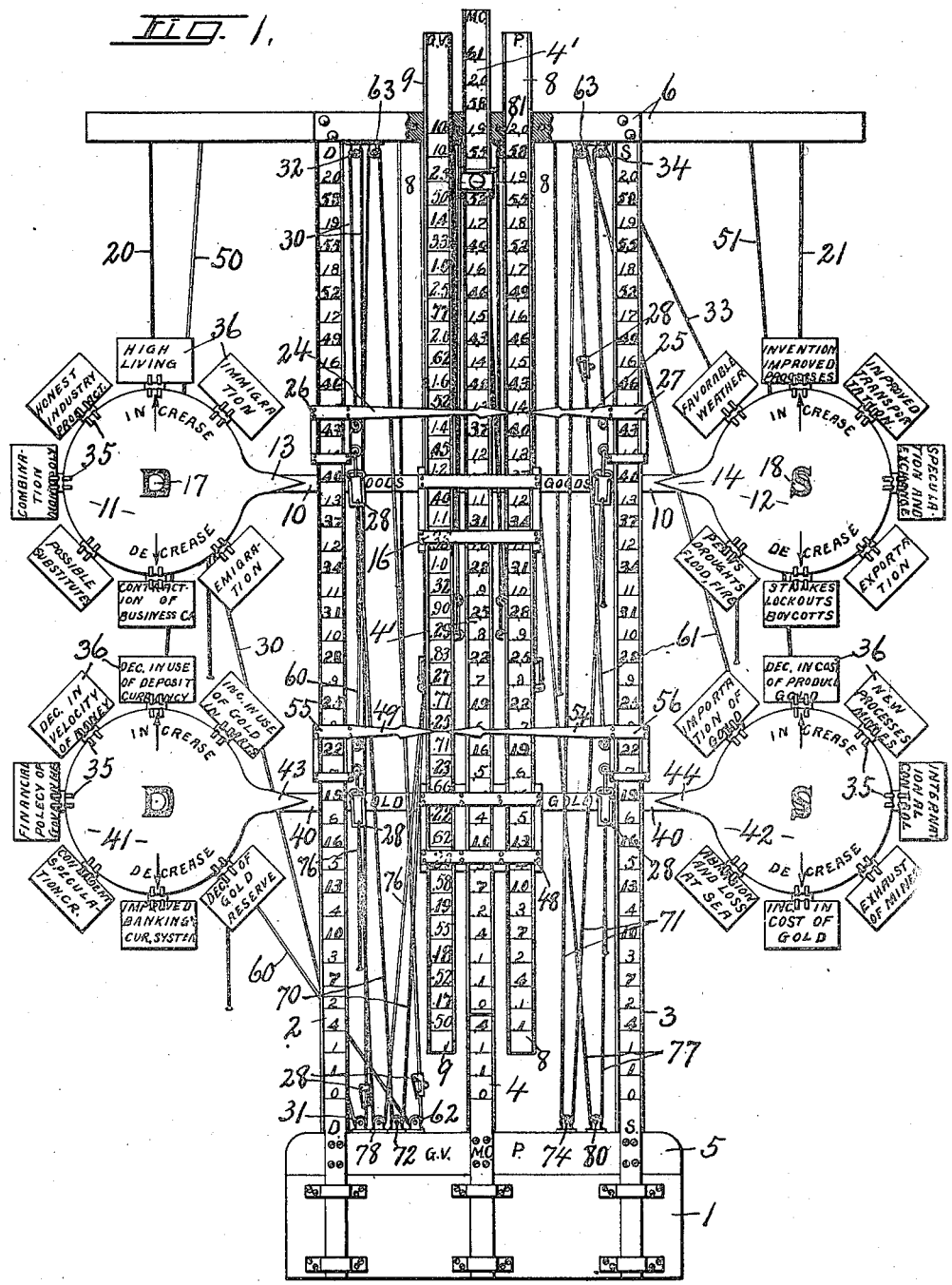

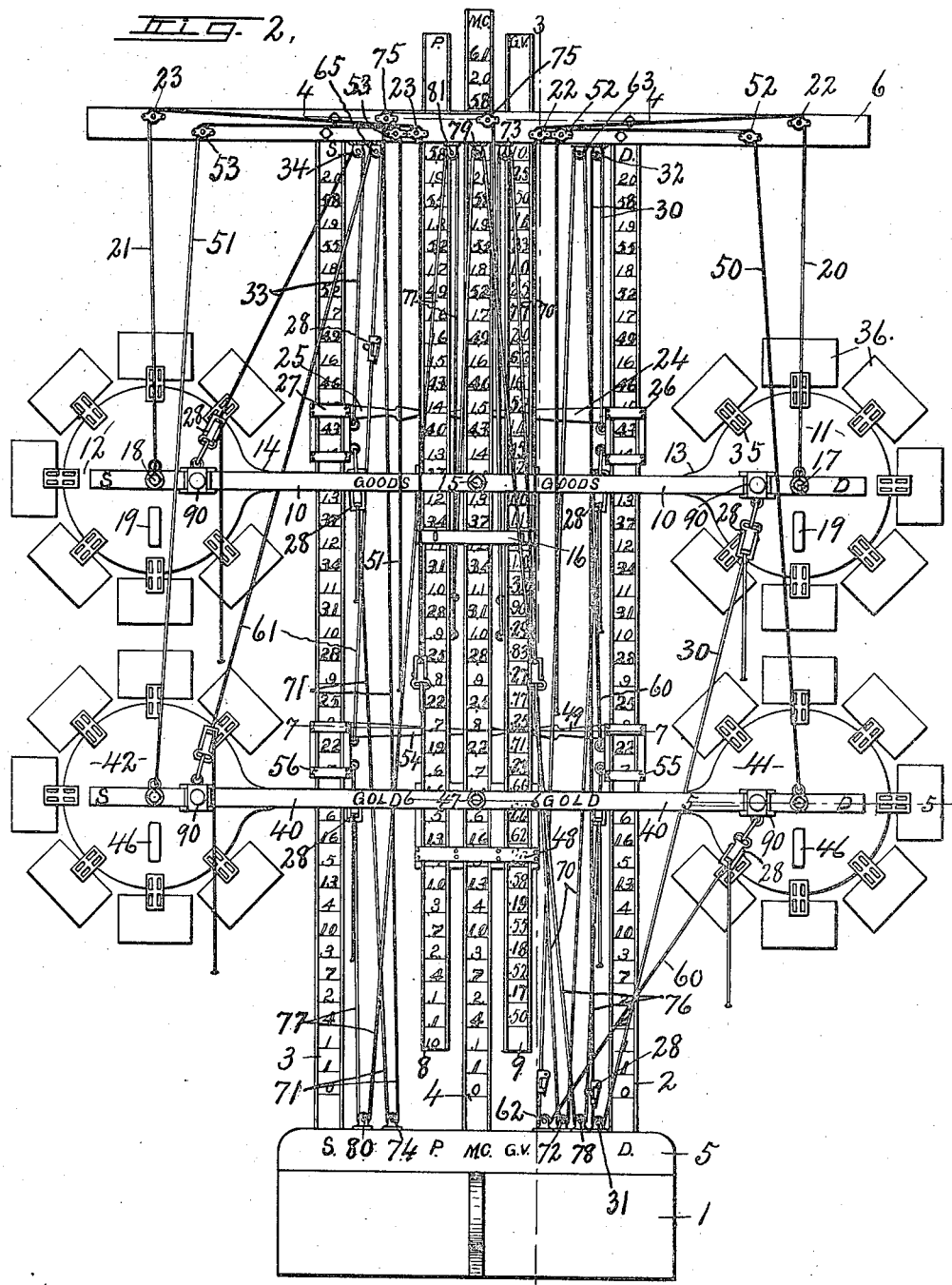

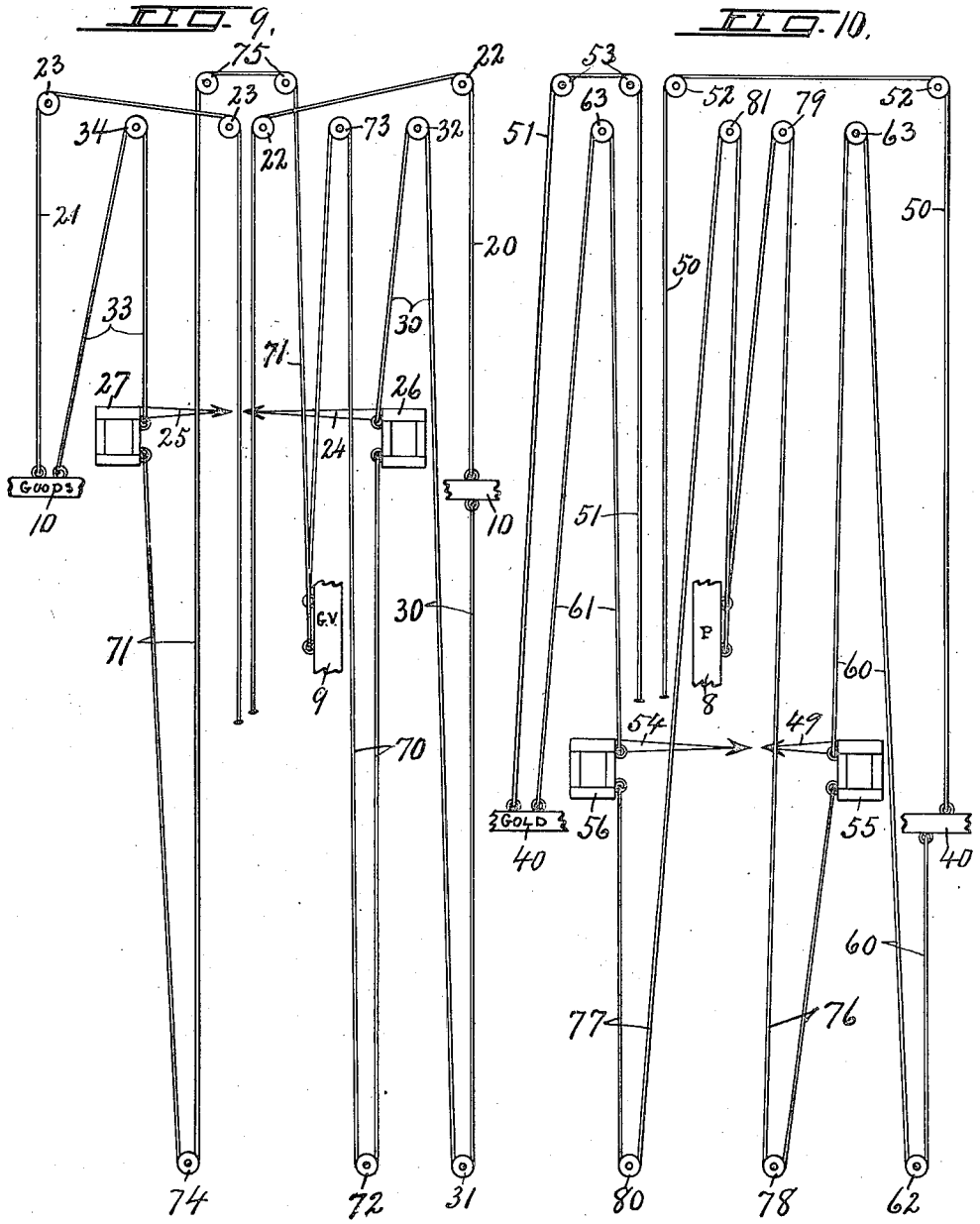

UNITED STATES PATENT OFFICE.

EDSON NEWTON TUCKEY, OF SYRACUSE, NEW YORK.

EDUCATIONAL APPLIANCE.

1,204,089.

Specification of Letters Patent.

Patented Nov. 7, 1916.

Application filed October 1, 1913. Serial No. 792,891.

*To all whom it may concern:*

Be it known that I, EDSON NEWTON TUCKEY, of Syracuse, in the county of Onondaga, in the State of New York, have invented new and useful Improvements in Educational Appliances, of which the following, taken in connection with the accompanying drawings, is a full, clear, and exact description.

This invention relates to certain improvements in educational appliances as a medium of instruction in the science of economics, including the production, exchange, distribution and use of wealth and the various forces which tend to influence or fluctuate commercial prices and standard values.

It is generally recognized that the fundamental relations existing between the various factors of commerce, such as demand, supply, marginal costs, values and prices of goods and gold, and also between such factors and the numerous forces or agencies which tend to affect or influence them, are not easily comprehended and are only vaguely understood except by educators and experts in this science and that under the present more or less abstract methods of instruction, the student finds it extremely difficult, without laborious and time-consuming effort, to fix in mind such relations or to properly apply the various forces to the particular commercial factor or factors which they affect. This condition is largely due to the widely diversified and complex nature of such forces and to the fact that the relations between the various commercial factors and forces which influence them are continually shifting which tends to confuse the mind and to render the science seemingly indefinite, theoretical and impracticable, but I have found that these forces may be definitely correlated to their respective factors and exhibited in their proper relations thereto in such manner as to produce in the mind of the student a comprehensive and lasting impression of the fundamental principles of economics after a comparatively short period of study and without excessive effort on the part of the instructor.

The main object, therefore, is to stimulate and encourage a more intelligent and universal study of this science and its practical application to commercial interests through the medium of a simple, practical and easily manipulated mechanical appliance by which the various factors of commerce and the numerous forces which tend to influence them may be brought into or represented as a unitary combination or association in their proper relations, whereby the student may see at a glance and readily comprehend the full scope and meaning of such relations and be able to determine approximately the result of the application of any particular force or forces to any predetermined commercial factor or factors which might be influenced thereby.

In other words, I have sought to exhibit, mechanically, through the medium of sliding scales of values, the causal, quantitative and functional relations existing between particular prices, costs, general price levels, purchasing power of gold, demand and supply of both goods and gold, and the multitudinous forces affecting these factors and also in turn affected by them.

Other objects and uses relating to specific parts of the apparatus will be brought out in the following description.

In the drawings—Figures 1 and 2 are respectively a front elevation and a rear elevation of an apparatus embodying the various features of my invention. Fig. 3 is a transverse vertical sectional view of the same apparatus taken on line 3—3, Fig. 2. Figs. 4, 5, 6 and 7 are enlarged transverse horizontal sectional views taken respectively on lines 4—4, 5—5, 6—6 and 7—7, Fig. 2. Fig. 8 is an enlarged sectional view of the clamp for frictionally locking the upright center bars together. Figs. 9 and 10 are diagrammatic views showing respectively the cord or cable connections between the goods-bar, price pointers, and gold-value bar and the cable connections between the gold-bar, gold-value pointers and price bar.

The entire apparatus is easily portable as a unitary structure and, as illustrated, comprises a suitable supporting base —1— carrying a plurality of, in this instance three, upright scale-bars —2—, —3— and —4— which are arranged side by side uniform distances apart and in parallelism and are rigidly connected at the bottom and top by horizontal cross bars —5— and —6— for holding them in fixed relation, thereby constituting a main supporting frame and guides for the various relatively movable parts hereinafter described.

The apparatus may, therefore, be conveniently positioned upon the floor of a class room or other locality between the instructor and students so that one side, designated as the front, faces the class while the opposite side or back faces the instructor thus permitting such instructor to face the students and to manipulate the various parts of the apparatus in illustrating any particular principle of economics which may be under discussion. These upright bars —2—, —3—, and —4— are preferably of uniform height and extend a considerable distance above the base to afford ample clearance for the vertical adjustment of the parts which are movable along the upright bars between the cross bars —5— and —6—, each of said bars being provided on each of its front and rear faces with separate vertical scales having their graduations spaced uniform distances apart and numbered in progressively increasing values from bottom to top so that like numbers will be approximately in horizontal alinement. In this particular instance, the numerals of one scale of each bar progressively increase in value by units from 1 to 20 while those of the other scale progressively increase in value in the relation of 1, 4, 7 and so on to 58, thereby extending the range of usefulness of the same device as will be hereinafter more fully explained, the different scales on the same side of the bar being distinguished from each other either by color, size or style, the values of one scale alternating with those of the other scale.

The scales on the bars —2— and —3— represent variations in quantitative values of demand and supply, said bars being designated respectively by the abbrevations "D" and "S" printed or otherwise impressed on the front and rear faces of the opposite ends thereof or upon the adjacent portions of the cross bars —5— and —6—.

The scales on the upright bars are preferably printed on both sides thereof in the same relation so that the instructor standing back of the apparatus may readily determine the position of the adjustable parts by the same readings as appear to the class in front.

In the preferred form of my invention, the scale or graduations when used on the middle bar —4— are the same and numbered in the same order as those on the bars —2— and —3—, but may be omitted and placed upon a sliding scale-bar —4'— which is adjustable lengthwise of and upon the bar —4— to conform to the adjustments of the "price" and "gold value" bars presently described and is held in its adjusted position by a friction clamp —39"—, Fig. 8. The scales on the bar —4'— are similar to those on the bars —2— and —3— to represent costs or marginal costs of both "goods" and "gold" and this bar may, therefore, be termed a "cost" or "marginal cost" bar for illustrating the relation between such costs and the prices of goods and value of gold.

In this connection it may be stated that if one seeks merely to read the equilibration of demand-quantities and supply-quantities and of demand-prices and supply-prices of both goods and gold in terms of each other in an exchange, it is unnecessary to use the marginal cost-bar, it being understood than any past cost of production of a commodity does not affect its present price, except as it influences the estimate of future costs, the minds of the buyers and sellers and consequently the demand and supply. But the theory is that under strictly ideal competitive conditions the output and supply of goods will be increased until, on the average or in general, the latter equals the quantity-demand at a price that is equal to market cost (including in cost the competitive rate of profits). In Fig. 1, however, the prices indicated are above the cost, the former being 1.40 and the latter 1.30.

For convenience, the apparatus is supplied with the double cost-bars —4— and —4'—, the bar —4'— being arranged to slide along the lower one and to be held in place by a clamp, as —39—. It is evident, however, that the stationary cost-bar —4— would be sufficient with means to indicate the figure on the cost-scale representing the marginal cost.

By arbitrarily adjusting the scale-bar —4'— the price-pointers can be used to indicate the cost as well as the prices so that having provided the double cost-bar and slide-indicator, the apparatus affords three methods of indicating the cost for comparison with the prices resulting from the equilibration of demand and supply, the adjustment of the cost-bar or indicator being made either before or after the equilibration of the other parts. Furthermore, the cost of both goods and gold may be indicated on the apparatus at the same time by either one of two methods:—first—by using two slide-indicators on the stationary cost-bar —4—; second—by using the sliding cost-bar —4'— and one clasp-indicator. In the latter case the price-pointers would also serve to indicate one of the costs.

If it is desired to indicate by means of the apparatus the effect upon prices of a change in a force operating upon the demand or supply of goods or gold, the apparatus including the cost-bar —4'— (or cost-indicators) would be adjusted to represent the conditions of cost, demand, supply, etc. Having indicated on a force-card the degree in change of the force in question, the effect of that change upon the cost-quantity, the demand-quantity, the supply-price, the demand-price or the exchange-price of both goods or gold, or upon all of the above-named elements combined would be shown by raising or lowering, as the case required, the demand and supply disks with their related pointers, bars, etc. The new equilibration of pointers would indicate not only the new price, but also their degree of variation from their costs, as shown by the cost-indicators in their original adjustment.

Associated with and movable lengthwise of the stationary bars —2— and —3— are additional upright scale-bars —8— and —9— which are located at opposite sides of and equidistant from the middle bar —4— so as to move vertically in the same plane as and between the stationary bars and are guided in suitable ways in the upper cross bar —6— as shown in Fig. 4. These bars —8— and —9— are designated respectively as a "price" bar and a "gold value" bar and are accordingly represented by the abbreviations "P." and "G. V." printed or otherwise impressed thereon or upon the adjacent portions of the main frame in alinement therewith, the price bar —8— being provided on its front face with separate scales similar to those on the stationary bars 2 and 3 while the gold-value bar is also provided with separate scales having their graduations alternating with each other, but designated by numerals which are the reciprocals of those on the price bar inversely arranged;—that is the numerical values .1, .1, .4, .2, .7, 3, 1.0, etc., reading from the bottom up on the price-bar —8— have their reciprocals 10. 10. 2.5, 5., 1.4, 3.3, 1.0, etc., reading from the top downward on the scale-bar —9—.

It, therefore, follows that if the graduations and corresponding numerals of both bars are similarly spaced and the numeral of one bar and its reciprocal on the other bar are registered with predetermined points, the simultaneous movement of both bars the same distance in reverse directions or the similar reverse movement of the points will give readings of different price numerals and their reciprocal gold value numerals and vice versa for the reason that the purchasing power of gold is the reciprocal of the general level of prices.

To facilitate operation the reciprocals of the various numerals on each sliding bar are printed or otherwise impressed on the edges thereof in line with the corresponding numerals so that they may be easily read by the operator particularly when adjusting the apparatus for use.

The fundamental law of the effect of fluctuations in quantitative values or demand and supply of both goods and gold above or below a predetermined level upon the prices and marginal costs of goods or upon the value of gold is more or less generally understood or may be easily explained by means of the scale bars and suitable pointers properly adjusted along said bars. For example, an increase or decrease in the supply of any particular kind of goods or commodity above or below a predetermined level produces a corresponding decrease or increase in the price of such commodity while on the other hand any increase or decrease in the demand of a commodity above or below a predetermined level produces a corresponding increase or decrease in the price of that commodity and, while these relations between quantitative values and prices of goods or commodities may be clearly pointed out on the scale bars, I prefer to illustrate these relations automatically and for this purpose have provided the apparatus with a floating cross bar —10— extending transversely across and at the back of the upright scale bars and some distance beyond the outer edges of the frame bars —2— and —3— for receiving and supporting separately movable disks —11— and —12— having their inner edges provided with pointers —13— and —14— movable along and in proximity to the edges of the stationary scale bars —2— —3— to register with any of the graduations thereon, thereby indicating any level or variations in quantitative values as the floating bar 10 or either end thereof is adjusted vertically. This floating bar may be designated as the "goods bar" and for this purpose bears the word "Goods" printed or otherwise impressed on at least the front side thereof so as to be visible to the students while the disks —11— and —12— and their pointers —13— and —14— may be designated respectively as the "demand disk and pointer" and "supply disk and pointer," said disks bearing the abbreviations D. and S. printed or otherwise impressed upon their front faces to distinguish one from the other, the demand disk —11— and its pointer —13— being movable along the demand scale bar —2— while the supply disk and its pointer —14— are movable along the supply scale bar —3—.

The "goods bar" —10— is centrally fulcrumed or pivoted at —15— to a vertically movable cross head or frame —16— which is slidable along and guided upon the intermediate scale bar —4— and adjacent sliding scale bars —8— and —9— and also forms an additional guide for the vertically movable scale bars.

The object of pivoting the goods bar —10— to the cross head —16— is to permit said bar to rock or tilt vertically for the purpose of moving the disks —11— and —12— and their pointers —13— and —14— along their respective scale bars —2— and —3— and thereby indicating quantitative variations in demand or supply of any commodity.

The pointers —13— and —14— are maintained in a substantially horizontal position by centrally pivoting their respective disks at —17— and —18— to the adjacent ends of the goods bar —10— and are counterweighted by suitable weights —19— to hold the disks and their pointers in horizontal position as the bar —10— is tilted vertically in either direction.

The floating bar —10— is supported and manipulated by suitable cords or cables —20— and —21— passing over separate sets of sheaves —22— and —23— on the top cross bar —6— and having their outer ends attached to the corresponding ends of the bar at points near the pivots of their respective disks —11— and —12— and their opposite ends suspended some distance below the upper cross bar near the center of the apparatus and within easy reaching distance of the operator where they may be manipulated at will to raise and lower either end of the goods bar and the corresponding disks and pointers, the inner sheaves —22— and —23— being preferably of the gripping type to hold the cords and parts carried thereby in their adjusted positions.

It is now evident that the goods bar —10— may be adjusted by means of the cords 20 and 21 along the scale bars —2— and —3— to any predetermined level or tilted to different angles within certain limits and that by operating the one cord and not the other the adjacent end of the bar and corresponding disk and pointer may be raised or lowered without materially changing the position of the other end of the bar and adjacent disk and pointer to bring such first-named pointer to any predetermined graduation on the adjacent stationary scale bar.

Associated with the goods-bar —10— and its demand and supply pointers —13— and —14— are separate price pointers —24— and —25— which are mounted respectively upon sliding heads —26— and —27—, the latter being movable lengthwise of and upon their respective demand and supply bars —2— and —3— to shift the pointers —24— and —25— along the graduations on the movable price bar —8— with which the pointers are adapted to register. These price pointers are adapted to move simultaneously with the vertical adjustment of their corresponding demand and supply disks —11— and —12— to show the effect on prices indicated by the price bar as a result of variations in either demand or supply from a predetermined level to which the goods-bar is normally set and for this purpose, the price pointer —24— or rather its slide —26— is connected by a cord or cable —30— to the end of the goods-bar near its point of connection with the demand disk —11—. That is, one end of this cable is connected, at the point specified, to the goods-bar and then passes downwardly around a sheave —31— on the upper edge of the bottom cross bar —5— and thence upwardly around a sheave —32— on the under side of the upper cross bar —6— and thence downwardly to the slide —26— so that the movement of the demand end of the goods-bar and its pointer —13— in either direction along the upright scale bar —2— causes a corresponding movement of the price pointer in the same direction along the scale of the price-bar —8— to show that an increase or decrease in the demand, as indicated by the demand-pointer on the scale-bar —2—, produces a corresponding increase or decrease in the price as indicated by the pointer —24— on the price bar. For a similar purpose, the slide —27— of the price pointer —25— is attached to one end of an operating cord or cable —33— having its intermediate portion passed over a sheave —34— on the upper cross bar —6— and its other end attached to the corresponding end of the goods bar —10— so that the vertical adjustment of the supply end of the goods bar and its pointer —14— in either direction along the supply-scale bar —3— produces a corresponding movement of the price pointer —25— but in a reverse direction to show that the prices fall with an increased supply and rise when the supply is decreased.

The raising and lowering of the demand and supply disks by means of the cords, therefore, represent the rise and fall of the demand and supply of any goods or commodity which may be under consideration while the raising and lowering of the price pointers similarly represent the rise and fall of prices as produced by the variations in demand and supply, the pointers —13— and —14— coacting with their respective scale bars —2— and —3— to indicate quantitative variations while the pointers —24— and —25—, coacting with their respective scale bars —8— and —9—, indicate different prices of such commodities as produced by the fluctuating quantitative values. These scales may be graduated and the apparatus adjusted so as to indicate absolute relations between varying degrees of fluctuations in quantitative values of any commodity and prices produced by such variations but the apparatus is designed primarily to indicate relative tendencies of quantitative and price values as affected by various forces which tend to influence the demand and supply as well as prices. In order that the relation of these forces to such commercial factors as demand, supply and prices may be clearly illustrated, the disks —11— and —12— are preferably made circular and of relatively large diameter for receiving upon their perimeters a series of clasps —35— adapted to retain one or more cards —36— bearing suitable indicia representing the forces which would be liable to produce quantitative variations of any commodity which may be under discussion. These cards may be termed "force cards" and those which represent forces tending to create an increased demand or increased supply are preferably attached to the tops or upper edges of their respective disks, while those representing forces tending to decrease the demand or supply are attached to the bottoms or lower edges of their corresponding disks and other cards representing forces which may either increase or diminish the demand or supply are placed centrally on the outer edges of the same disks, thereby showing at a glance the exact relations and effects of any one or more of those forces upon the demand or supply of any selected commodity and through such variation of quantitative value shows the relation between these forces and the varying prices of such commodity.

The clasps —35— and cards supported thereby may be removed and replaced at will and in like manner the force cards may be removed and replaced from and upon the clasps and may be interchanged or substituted by others at will, it being understood that owing to the widely diversified forces which might affect quantitative values, the cards may be classified according to their effect upon such values.

For example, the cards, representing forces tending to increase the demand, may be kept in one package while those tending to decrease the demand may be kept in a separate package and, in like manner, the cards representing the forces which tend to increase and those which represent any forces tending to decrease the supply may be kept in separate packages ready for use in connection with the discussion of the relation between demand, supply, prices and the various forces which tend to influence them. I have also shown in the same apparatus means for illustrating the effect of variations in the demand, supply, values and prices of gold upon the demand, supply, prices and price level of goods and also the inverse relation or effect in variations in demand, supply, prices and price level upon quantitative and price values of gold and for this purpose have provided an additional floating bar —40—, which will be termed the "gold bar" as extended transversely of and across the back of the upright scale bars and some distance beyond the outer edges of the stationary bars —2— and —3— in a plane below the goods bar —10—, the outer ends of the gold bar being provided respectively with a demand disk —41— and a supply disk —42— similar to the goods disks —11— and —12—. These disks —41— and —42— are pivoted to the adjacent ends of the bar —40— and are provided with pointers —43— and —44— movable along and in proximity to the outer edges of the upright demand and supply bars —2— and —3— as either end of the bar —40— is raised or lowered in the manner presently described, said disks being maintained in substantially horizontal positions by counterweights —46— similar to and operating in the same manner as the counterweights —19— for the disks —11— and —12—.
The gold bar —40—, like the goods bars —10—, is centrally fulcrumed or pivoted at —47— to a cross-head —48— which like the cross head —16— is slidable vertically along and upon the middle bar —4— and adjacent sliding bars —8— and —9— which in turn are guided in their vertical movement in suitable ways in the cross head —48—. These disks —41— and —42— also bear the abbreviations D. and S. respectively, indicating "demand" and "supply" of gold and, like the disks —11— and —12—, are provided with suitable clasps —35— for receiving force cards —36— distributed around and upon the periphery thereof in a manner similar to that described for the cards —36— on the disks —11— and —12— to indicate the direction of influence which the forces marked on the cards may exert upon the demand or supply of gold, the same description applied to the force cards for the goods bar being applicable to those for the gold bar except that the force cards for the gold bar represent the forces which tend to influence the demand, supply, prices and value of gold.

The floating gold bar —40— is supported and manipulated by suitable cords or cables —50— and —51— passing over separate sets of sheaves —52— and —53— on the upper cross bar —6— and having their outer ends extending downwardly and attached to the floating bar —40— at or near their pivotal connections with the disks —41— and —42— and their inner ends extending downwardly near the center of the apparatus and within easy reaching distance of the operator where they may be manipulated at will either simultaneously or independently to lower and raise the bar or either end of said bar together with the corresponding disk and pointer, the inner sheaves —52— and —53— being preferably of the gripping type to hold the cables and bar supported thereby in their adjusted positions. Associated with this gold bar are separate gold value pointers —49— and —54— which are secured to suitable slides —55— and —56— and like the slides —26— and —27— are movable lengthwise of and upon the stationary upright scale-bars —2— and —3—, the free ends of the pointers being movable along the graduations on the gold-value bar —9—. These pointers may, therefore, be termed "gold-value pointers" and are adapted to be operated along the scale bar —9— simultaneously with the vertical movements of the corresponding ends of the gold bar or pointers —43— and —44— so as to indicate price variations simultaneously with quantitative variations in the demand or supply of gold and for this purpose, are respectively connected to corresponding ends of the gold bar by separate cords or cables —60— and —61—. The cable —60— is attached at one end to the demand end of the gold bar and extends downwardly around a sheave —62— on the lower cross bar —5— and thence upwardly over a sheave —63— on the upper cross bar and then downwardly to its point of attachment with the slide —55— so that, as the demand end of the gold bar is moved vertically in either direction, the adjacent gold-value pointer —49— will be correspondingly moved in the same direction to indicate that as the demand for gold increases, there will be a corresponding increase in its value.

The cord or cable —61—, having one end attached to the slide —56— is passed upwardly over a sheave —65— on the upper cross bar —6— and then downwardly and has its opposite end attached to the supply end of the gold bar —40— whereby, as the supply end of the gold bar is raised or lowered, the slide —56— will be moved a corresponding distance but in the reverse direction along the gold value bars —9—, thus indicating that the value of gold increases with the increased supply and decreases with a reduced supply.

Another feature of my invention lies in the means for showing the relation or interdependence of prices or price values of goods and gold values and for this purpose, the price pointers —24— and —25— or rather their slides —26— and —27— are connected by cords or cables —70— and —71— to the gold value bar —9—.

The cable —70— has one end attached to a slide —26— and extends downwardly around a suitable sheave —72— on the lower cross bar —5— and thence upwardly around a sheave —73— on the upper cross bar —6— and then downwardly to its point of attachment with the gold-value bar —9—.

The cable —71— extends downwardly from its point of attachment to the slide —27— around a suitable sheave —74— on the lower cross bar —5— and thence upwardly around a pair of sheaves —75— on the upper cross bar —6— and then downwardly to its point of attachment to the gold-value bar —9—. In a somewhat similar manner, the gold-value pointers —49— and —54— or rather their slides —55— and —56— are connected by cords or cables —76— and —77— to the price bar —8—, the cord or cable —76— being extended downwardly from its point of attachment to the slide —55— around a sheave —78— on the lower cross bar —5— and thence upwardly around a sheave —79— on the upper cross bar —6— and then downwardly to its point of attachment to the price bar —8—.

The other cord or cable —77— extends downwardly from its point of attachment to the slide —56— around a sheave —80— on the lower cross bar —5— and thence upwardly around a sheave —81— on the upper cross bar —6— and thence downwardly to its point of attachment to the price bar —8—.

Any one or more of the several cords previously described may be properly adjusted or tensioned by means of one or more clasps as —28—, Fig. 2, to bring the various parts operated thereby into proper relative adjustment, the connections between said cords, bars and slides being easily detachable when necessary or desirable to illustrate the operation of any individual part of the device independently of the other parts.

It is now clear that any vertical adjustment of the goods bar —10— which will move either or both of the pointers —13— and —14— along the upright scale bars —2— and —3— will produce a corresponding vertical movement of the gold-value bar —9— relatively to the gold-value pointers —49— and —54— to show that any force which influences the general level of supply and demand or prices of goods, as indicated by the pointers —13— and —14—, and —24— and —25—, also influences the value of gold as indicated by the pointers —49— and —54— and conversely the same part of the apparatus may be used to illustrate that any force which influences the value of gold also affects the general level of quantitative values and prices of goods.

It is evident, however, that by disconnecting the cords or cables —70— and —71— from their respective slides —26— and —27—, the apparatus may be used to indicate simply the variations in prices or price levels as produced by variations in quantitative values of supply and demand of goods through the operation of various forces indicated by the force cards upon the quantitative values or prices of goods or when the cords or cables —70— and —71— are connected in the manner described, the price pointers —24— and —25— may be ignored and the relation between variations in the supply and demand of goods and gold values and the forces which influence these factors may be clearly demonstrated. In a similar manner, the vertical adjustment of the gold bar —40— and corresponding pointers —43— and —44— along the scale bars —2— and —3— by means of the operating cords —50— and —51— produces a corresponding vertical adjustment of the price bar —8— through the medium of the cords —60— and —61—, —76— and —77— which may be considered as continuous in connection with the corresponding slides —55— and —56— to show that any forces represented by the force cards on the demand and supply disks of the gold bar which may effect gold values as indicated by the pointers —49— and —54— will influence price levels of goods as indicated by the movement of the price bar —8— relatively to the price pointers —24— and —25— and conversely the vertical adjustment of the price bar —8— will produce a corresponding adjustment of the gold-value pointers —49— and —54— and also the gold bar —40— to indicate the effect of the adjustment of the price bar on supply and demand of gold as represented by the gold pointers —43— and —44—.

It is evident, however, that the cords —76— and —77— may be disconnected from their respective slides —55— and —56— and the gold-value pointers —49— and —54— used independently in connection with the gold bar to indicate the effect of certain forces acting upon the supply and demand of gold upon gold values.

As previously stated, the marginal cost bar —4'— is adjustable vertically relatively to and independently of the price bar —8— and gold-value bar —9— and, therefore, relatively to the price pointers and gold-value pointers to conform to a change of position of the gold-value and price-bars relative to the demand and supply bars, due to changes in the value of gold and general price levels, which in turn are due to changes in demand and supply and their underlying forces.

The demand and supply disks on the gold bar —40— are similar to the disks —11— and —12— on the goods bar and are equipped with suitable clasps —35— for receiving force cards —36— upon which are printed or otherwise impressed indicia of forces which affect the demand and supply of gold, said force cards being placed upon their respective disks in the manner previously described in reference to the force cards on the disks of the goods bar according to the direction of influence exerted by such forces upon quantitative gold values and prices of gold.

The cords —30— and —33— and also the cords —60— and —61— are attached to sliding members —90— which are adjustable lengthwise of and upon their respective bars —10— and —40— to afford a wider variation in the relative degrees of movement of the pointers and movable scale bars in accordance with the varying degrees of elasticity of demand and supply and other varying conditions which may require such adjustment.

The apparatus shown and described is particularly valuable from a pedagogical point of view in demonstrating the causal and functional relations existing between demands, supplies, costs and prices of goods; between the demands, supplies, costs and prices of gold; between values of gold and both particular prices and general price levels of goods, and between all of those factors and the fundamental facts and forces operating through demands and supplies to fix exchange values but it is evident that these various relations may be clearly demonstrated in a general way without the use of either the fixed or sliding scales and that certain of the specific relations referred to may be demonstrated by parts of the apparatus irrespective of other parts.

It is also evident that various changes may be made in the structural details of the apparatus without departing from the spirit of my invention and, therefore, I do not limit myself to the precise structure shown and described.

What I claim is:

1. In an educational appliance for teaching economics, an upright scale representing quantitative variations, and a holder movable along the scale bar and bearing indicia representing forces which cause such variations.

2. An educational appliance having an upright scale-bar graduated to represent quantitative variations, a transversely extending bar movable along the scale-bar, a disk pivoted to said bar and provided with a pointer movable along the scale-bar, and force cards mounted on the disk and bearing indicia representing forces which influence quantitative values.

3. An educational appliance comprising an upright scale-bar having a scale of marginal costs, a separate scale-bar having a scale of prices, said bars being movable relatively to each other, and a pointer movable along the scales of both bars.

4. An educational appliance comprising an upright scale-bar having a scale of quantitative values, a separate upright bar having a scale of marginal costs, and separate pointers movable along their respective scales.

5. An educational appliance having a scale of quantitative values, a pointer movable along said scale, a separate scale of prices, a pointer movable along the price scale, and connections between said pointers for transmitting motion from one to the other.

6. An educational appliance having a scale of quantitative values, a pointer movable along said scale, a separate scale movable relatively to the first named scale, and connections between said pointer and movable scale for transmitting motion from one to the other.

7. A mechanical appliance for teaching economics comprising a quantitative scale, a price scale, separate pointers movable along said scales, and means for transmitting motion from one pointer to the other.

8. In a mechanical appliance for teaching economics, a scale of quantitative demand values, a separate scale of price values, separate pointers movable along said scales, and means for transmitting motion from one pointer to the other.

9. In a mechanical appliance for teaching economics, a scale of quantitative supply values, a separate scale of price values, separate pointers movable along said scales, and means for transmitting motion from one pointer to the other.

10. In a mechanical appliance for teaching economics, separate scales indicating, respectively, quantitative demand values and quantitative supply values, a third scale indicating price values, separate pointers movable along said scales, means for moving the pointers for the quantitative scales simultaneously, and means for transmitting motion from one of said pointers to the pointer for the price scale.

11. In a mechanical appliance for teaching economics, a pair of upright bars having quantitative demand and supply scales, respectively, a separate upright bar having a price scale, pointers movable along the quantitative scales, additional pointers movable along the price scale, separate devices for moving the pointers for the quantitative scales, simultaneously or independently of each other, and additional devices for transmitting motion from the last named pointers to the pointers for the price scale.

12. In a mechanical appliance for teaching economics, a pair of upright bars having quantitative scales representing demand and supply values, respectively, an additional upright bar having a scale of price values, a cross bar movable vertically along the first-named bars, means for operating the cross bar, a pointer movable along the scale on the price bar, and means for transmitting motion from the cross bar to said pointer.

13. In a mechanical appliance for teaching economics, a pair of upright bars having scales indicating quantitative values of supply and demand, respectively, a cross bar movable vertically along said bars, separate devices for raising and lowering either end of the cross bar independently of the other end, an additional upright bar having a scale of price values, separate pointers movable along the price scale, and means for transmitting motion from the cross bar to said pointers.

14. In a mechanical appliance for teaching economics, a scale representing quantitative values, an indicator movable along said scale, members mounted on the indicator bearing indicia of forces which influence such quantitative values, a separate scale indicating price values, an indicator movable along the price scale, and means for transmitting motion from one indicator to the other.

15. In a mechanical appliance for teaching economics, a scale representing quantitative values, a separate scale representing gold values and adjustable lengthwise of the first-named scale, an indicator movable along the quantitative scale, means for transmitting motion from said indicator to the gold value scale, and a separate indicator for the last-named scale.

16. In a mechanical appliance for teaching economics, an upright bar having a scale representing quantitative values, an indicator movable along said scale, operating means for said indicator, an additional upright bar movable vertically and provided with a scale representing gold values, an indicator for the gold value scale, and means for moving the gold value bar simultaneously with the movement of the first-named indicator.

17. In a mechanical appliance for teaching economics, an upright bar having a scale representing quantitative values, a separate upright bar having a scale of price values, separate indicators movable along their respective scales, a vertically movable upright bar having a scale representing gold values, means for operating the indicators and gold value bar simultaneously, and means for indicating the degree of adjustment of the gold value bar.

18. In a mechanical appliance for teaching economics, an upright bar having a scale representing quantitative values, a vertically adjustable upright bar having a scale representing price values, an indicator movable along the quantitative scale, means for moving said indicator and price bar simultaneously, and means for indicating the degree of adjustment of the price bar.

19. In a mechanical appliance for teaching economics, an upright bar having a scale representing quantitative values, an additional upright bar having a scale representing gold values, indicators movable along said scales, a vertically adjustable upright bar having a scale representing price values, means for operating said indicators and price bar simultaneously, and means for indicating the degree of adjustment of the price bar.

20. In a mechanical appliance for teaching economics, an upright bar having a scale representing quantitative values, an indicator movable along said scale, a separate upright bar having a scale representing gold values, an indicator movable along the gold value scale, and means for operating the indicators simultaneously.

21. In a mechanical appliance for teaching economics, an upright bar having a scale representing quantitative values, an indicator movable along said scale, members mounted on the indicators and bearing indicia representing forces which influence quantitative values, a separate upright bar having a scale representing gold values, an indicator movable along the gold value scale, and means for moving the indicators simultaneously.

22. In a mechanical appliance for teaching economics, an upright bar having a scale representing quantitative values, a separate upright bar having a scale representing price values, an additional upright bar adjustable lengthwise of the price bar and provided with a scale representing marginal cost values, means for clamping the marginal cost bar in its adjusted position, indicators movable along said scales, and means for operating the indicators simultaneously.

23. In a mechanical appliance for teaching economics, the combination of a frame having a pair of upright bars provided with scales representing, respectively, quantitative demand values and quantitative supply values, an additional pair of upright bars having scales representing, respectively, price values of goods and gold values, separate pairs of indicators movable along the quantitative scales, an indicator movable along the price scale, a separate indicator movable along the gold value scale, means for operating the price indicator and one pair of indicators simultaneously, and separate means for operating the gold value indicator and the other pair of indicators simultaneously and independently of the operating means for the price indicator.

In witness whereof I have hereunto set my hand this 26th day of September, 1913.

EDSON NEWTON TUCKEY.

Witnesses:
  H. E. CHASE,
  EVA E. GREENLEAF.